Patented Aug. 24, 1943

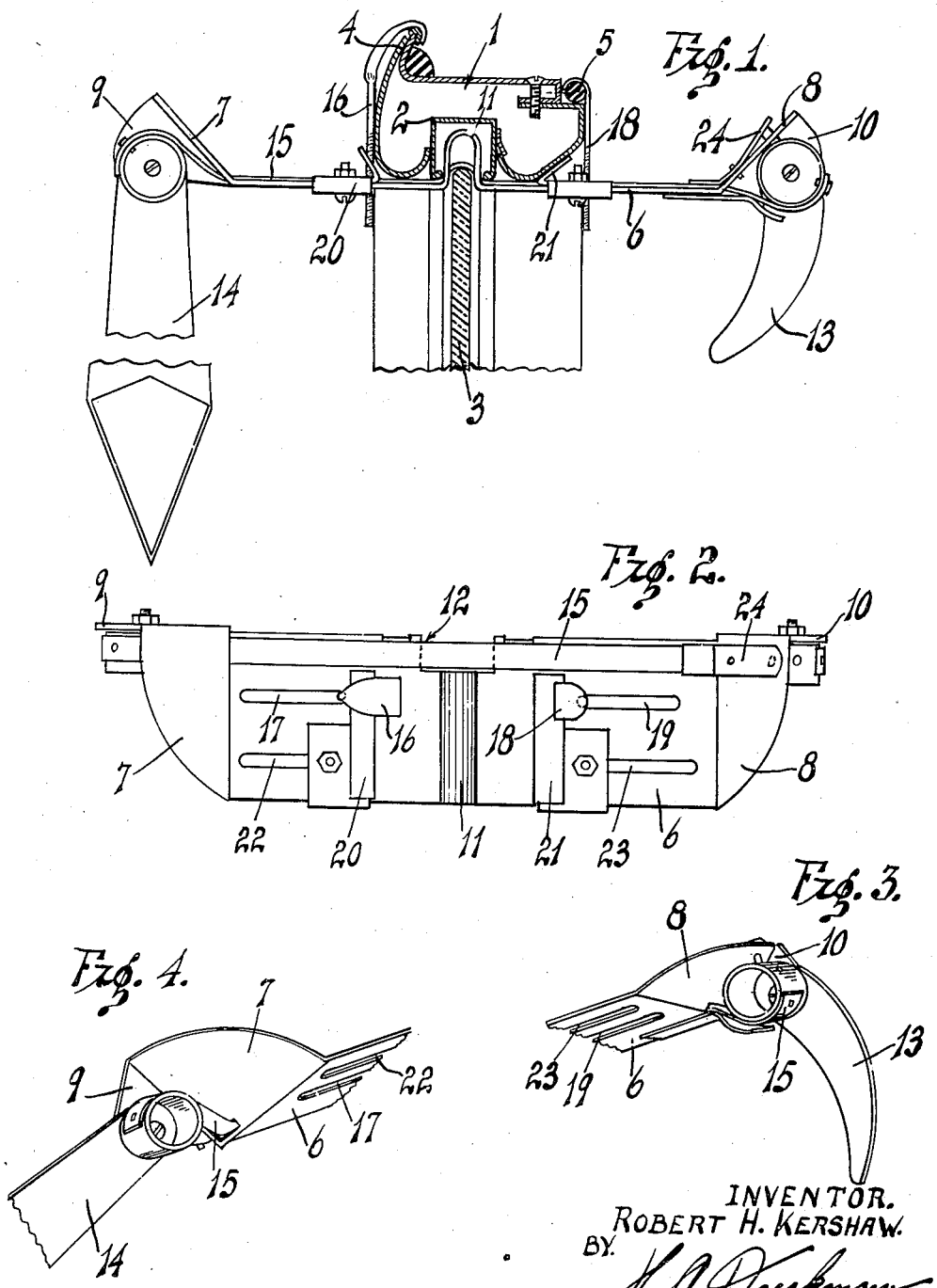

2,327,905

UNITED STATES PATENT OFFICE 2,327,905

MOUNT FOR DIRECTION SIGNALS

Robert H. Kershaw, Long Beach, Calif.

Application October 27, 1941, Serial No. 416,629

3 Claims. (Cl. 116—52)

This invention relates to a mount for direction signals, and the like, which are used on motor vehicles.

An object of my invention is to provide a novel mount for direction signals, and the like, which may be mounted on the door of a vehicle without injuring or marring the door with bolts, screws, or the like.

Still another object is to provide a novel mount for direction signals, and the like, including a flexible strap which extends between the signal arm and the actuating finger, said strap permitting the window of the vehicle to be entirely closed.

Still another object is to provide a novel mount for direction signals, and the like, which is simple in construction, easy to install, and inexpensive to manufacture.

Other objects, advantages and features of invention may appear from the accompanying drawing, the subjoined detailed description and the appended claims.

In the drawing:

Figure 1 is a fragmentary transverse sectional view of a vehicle door with my mount installed thereon.

Figure 2 is a top plan view of my mount.

Figure 3 is a fragmentary perspective view of the actuating end of the mount.

Figure 4 is a fragmentary perspective view of the signal end of the mount.

Referring more particularly to the drawing, the numeral 1 indicates the frame of a vehicle door. This frame includes a channel 2 into which the glass 3 fits when this glass window is closed. The frame 1 also includes a flange 4 along its outer edge, and a packing 5 along the inner edge. My mount includes a plate 6, preferably formed of a suitable metal, and positioned transversely of the door frame 1, substantially as shown in Figure 2. At each end, the plate 6 is bent upwardly at an an angle, as shown at 7 and 8. One of the edges of the parts 7 and 8 are bent downwardly to form supporting ears 9 and 10, respectively. In approximately the center of the plate 6, an upwardly bent channel 11 is formed which extends into the channel 2 for the purpose of preventing transverse movement of the mount, as will be further described.

The channel 11 extends part way across the width of the plate 6, leaving a notch 12 on one side of the plate. An operating finger 13 is journaled on the ear 10, and a signal arm or the like, 14, is journaled on the ear 9. A flexible strap 15 is secured at each end to the finger 13 and the arm 14. This strap extends along the plate 6, preferably on its upper surface, and also extends over the notch 12. When the door window 3 is closed, it will move upwardly into the channel 11, and will bend the flexible strap 15 upwardly, as shown in Figure 1. Since this strap is flexible, it will readily bend and permit complete closure of the window.

A hook 16 engages the flange 4, and is adjustable in a slot 17 in the plate 6. A second hook 18 engages the flange, or packing 5, and is adjustable in a groove 19 in the plate 6. A pair of fingers 20 and 21 bear against the side of the frame 1 to further stabilize the mount and prevent accidental shifting. The fingers 20 and 21 are adjustable on the plate 6 in grooves 22 and 23, respectively.

When it is desired to operate the signal arm 14, the finger 13 is swung upwardly, which pulls the strap 15 across the plate 6, thus swinging the arm 14 into the desired signaling position. Even though the window 3 is closed, the flexible strap 15 will still operate effectively. A catch 24, of the spring type, may be mounted on the end 8 and engages the finger 13 to hold this finger in a desired signaling position.

Having described my invention, I claim:

1. A mount adapted to be positioned on a vehicle door, comprising a plate extending transversely of the door, fastening means on the plate engaging the door, whereby said plate is held in position on the door frame, an actuating finger mounted on one end of the plate, a signal means mounted on the other end of the plate, and a flexible strap extending longitudinally over said plate and attached at one end to the actuating means, and at the other end to the signal means, said plate having a channel formed therein into which the glass window of the door may extend, a portion of said channel being cut out to allow said flexible strap extending across the cut out portion of the channel to be flexed upwardly when the window enters said channel.

2. A mount adapted to be positioned on a vehicle door, said door including a moveable window, said mount comprising a plate, an ear formed at each end of the plate, an operating finger journaled on one of the ears, a signal means journaled on the other ear, a flexible strap secured at one end to the actuating finger, and at the other end to the signal means, said flexible strap extending longitudinally over said plate, and fastening hooks mounted on the plate and engaging the door frame whereby the plate is mounted on the door, a channel extending transversely across the plate, said channel being adapted to enter the window channel in the door, said first mentioned channel having a cut away portion over which said flexible strap extends, and is adapted to flex upwardly when the window enters said first mentioned channel.

3. A mount adapted to be positioned on a vehicle door, said door including a movable window, said mount comprising a plate, an ear formed at each end of the plate, an operating finger journaled on one of the ears, a signal means journaled on the other ear, a flexible strap secured at one end to the actuating finger, and at the other end to the signal means, said flexible strap extending longitudinally over said plate, and fastening hooks mounted on the plate and engaging the door frame whereby the plate is mounted on the door, and bearing fingers adjustably mounted on said plate, said fingers bearing against the door frame, a channel extending transversely across the plate, said channel being adapted to enter the window channel in the door, said first mentioned channel having a cut away portion over which said flexible strap extends, and is adapted to flex upwardly when the window enters said first mentioned channel.

ROBERT H. KERSHAW.